3,526,129
Patented Sept. 1, 1970

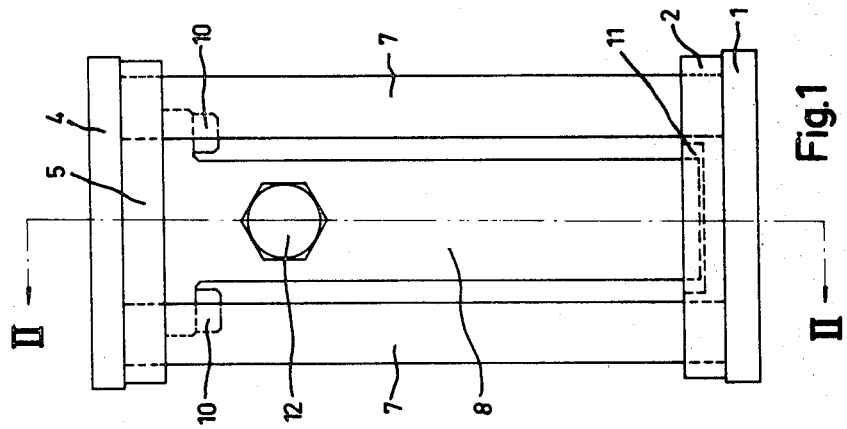
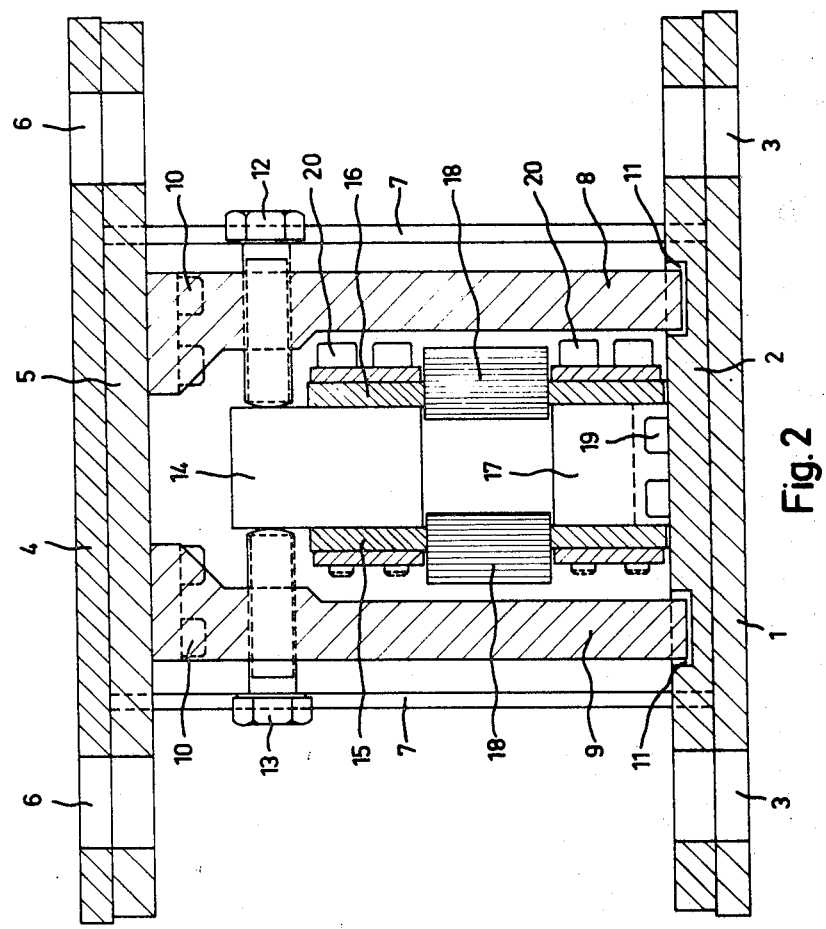

3,526,129
ARRANGEMENT FOR MEASURING TENSILE FORCES
Ake Anderson, Vallingby, Sweden, assignor to Arenco Electronics Aktiebolag, Stockholm-Vallingby, Sweden
Filed Dec. 18, 1967, Ser. No. 691,280
Claims priority, application Sweden, Dec. 30, 1966, 17,949/66
Int. Cl. G01e 5/04, 5/10, 1/12
U.S. Cl. 73—144                                6 Claims

ABSTRACT OF THE DISCLOSURE

An arrangement for measuring tensile forces in articles in the form of strip, wire-rope, wire or the like, said article being arranged to abut a roller or a similar means, said arrangement comprising two parallel plates, one of which supporting the roller and the other being arranged on a stationary support, between said plates and extending perpendicular thereto a number of resilient members being disposed and inside said members between the plates two rigid members being arranged, between said rigid members and between the rigid members and the plate on the support measuring rods of a magnetoelastic material being arranged.

---

The present invention is concerned with an arrangement for determining the tensile force in articles of strip, wire-rope, wire or the like arranged to abut a roller, cylinder or similar means; the arrangement comprising two parallel plates and a number of measuring rods in the form of magnetoelastic transmitters, arranged between said plates, wherein the roller is arranged on the one plate and the second plate is arranged on a firm support, the said roller being actuated by a force which emanates from the tensile force in the article and which can be divided into a component force acting at right angles to the plates and a component force acting parallel with said plates.

In the continuous manufacture of articles in the form of strip, for instance, it is necessary to supervise the tension in the strip and when necessary to regulate said tension to a specific magnitude. To enable the tension in the strip to be determined continuously strip is passed over a so-called bridle roller or pulley. For this purpose the path of movement of the strip is suitably arranged so that the angle at which said strip meets the surface of the bridle roller, relative to a plane through the axis thereof, differs from the angle at which the strip leaves said surface. Such an arrangement is illustrated in FIG. 5.

Figure 5:
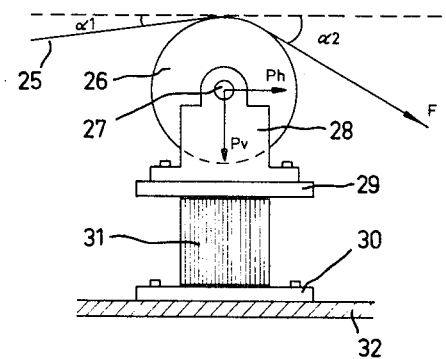

In FIG. 5 is shown a roller 26 arranged on a shaft 27, journaled in bearing means 28. The bearing means are secured to a plate 29. A second plate 30 is secured to a solid support 32. Between the plates 29 and 30, which are parallel to one another, is arranged a body 31 which includes one or more magnetoelastic transmitter elements. An article in the form of strip, for instance, is passed over the roller 26. The strip may be of paper. The path of movement of the strip is deflected over the roller so that it forms a certain entry angle $\alpha 1$ and a certain departure angle $\alpha 2$ to the horizontal plane. The tension in the strip is of the magnitude F. This force can be divided into horizontal and vertical components. Thus acting on the shaft of the roller 26 is a resulting horizontal component $Ph$, extending parallel with the plates, and a resulting vertical component $Pv$, acting perpendicular to said plates. The last mentioned component also includes the weight of the roller. The transmitter elements between the plates 29 and 30 are hence adapted to determine the horizontal component $Ph$. However, the transmitter elements must also, at the same time, take up the vertical force component $Pv$. This means that in the case of large forces a plurality of transmitter elements must be used.

This disadvantage is eliminated by an arrangement according to the invention, which enable large forces to be determined without using more than one or two transmitter elements. The invention is mainly characterized in that a number of resilient means are positioned between the parallel plates and at right angles thereto, and are so dimensioned that they absorb said force component perpendicular to the plates, and in that arranged between said plates at right angles thereto and inside the resilient members are at least two rigid members, between which one or more magnetoelastic measuring rods are arranged, at least one of the rigid members being securely attached to the plate which supports the roller and said rigid members being adapted to be actuated by said force component parallel to the plates.

Figure 3:
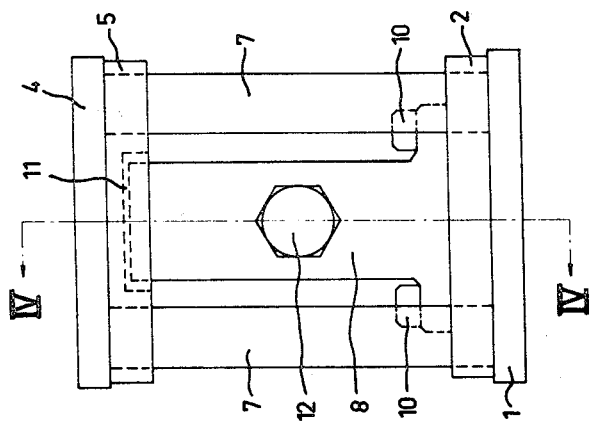
Figure 4:
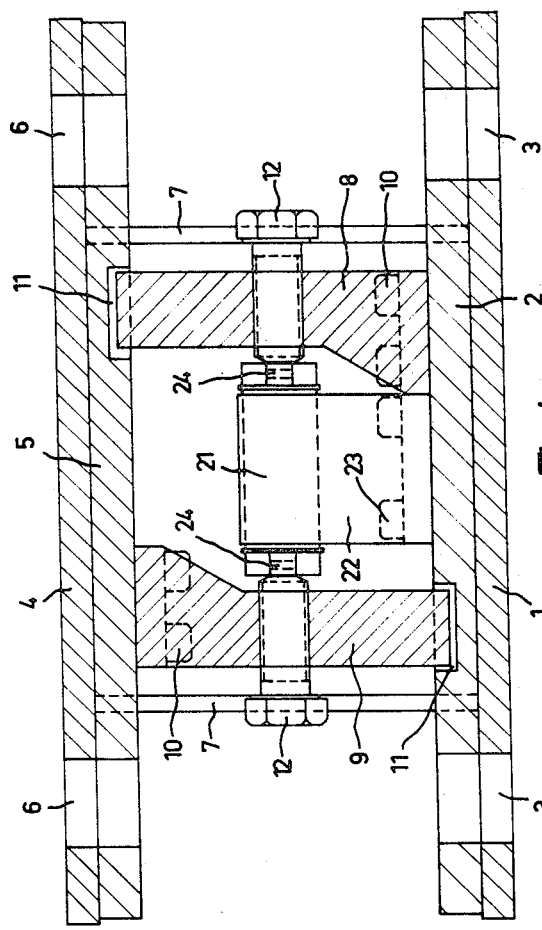

The invention will now be described with reference to the accompanying drawings, wherein FIGS. 1 and 2 show different views of one embodiment of the invention, while FIGS. 3 and 4 show the same views of another embodiment and FIG. 5 illustrates how the measuring arrangements are mounted below a roller.

FIG. 2, which shows a section taken through the line II—II in FIG. 1, illustrates one embodiment of the measuring arrangement according to the invention. The arrangement comprises a bottom plate which includes two plate sections 1 and 2. Disposed in the plates are holes 3 for receiving screws, by means of which the arrangement is secured to a firm foundation, arranged parallel to the bottom plate is a second plate, also comprising two plate sections 4 and 5 on which the bearing supporting the roller is arranged. Holes 6 are disposed in the plate sections for this purpose. Between the plates are located four resilient members 7 in the form of rods, which bend when acted upon by longitudinally directed forces and spring back when the force ceases to act. The resilient members may be in the form of leaf springs and, if desired, may be arranged so that their lines of direction are symmetrical with respect to the axis of the roller. The rods 7 are positioned in the corners of a rectangle. Positioned within the rectangle are two rigid members 8 and 9, securely connected to the upper plate by means of screws 10. The other end of the rigid members, however, is clear of the bottom plate. Arranged in the bottom plate are recesses 11 for the respective members 8 and 9 which are adapted to constitute a safeguard against overloading so that if the upper plate is acted upon by a force which exceeds the force for which the rods 7 are dimensioned the downward movement of the plate is arrested by the ends of the members 8 and 9 coming into contact with the bottom of the recess 11.

The magnetoelastic transmitters 18 acted upon by the force parallel to the plates are situated between the members 8 and 9 and arranged on arms 15 and 16, respectively. The arms are connected by means of supports 14 and 17; the support 17 being secured to the bottom plate by screws 19. Arranged in the members 8 and 9 are two bolt-like members 12 and 13, which abut the support 14 and which fix the position of the upper plate in relation to the position of the transmitters.

By screwing the bolt members against the support 14 a fixed connection is obtained between support 14 and the members 8 and 9, and thereby also between the transmitter element 18 and the upper plate sections 4, 5. When the upper plate sections 4, 5 are subjected to the action of a force parallel to the sections the members 8 and 9, together with the bolt-like members is displaced, which means that the member 14 is also displaced somewhat. Actuation of the support member 14 causes the one measuring rod to be subjected to a tensile stress and the other to a compression stress. In connection herewith the windings of the two rods are so connected that in a mechanically unloaded state no output signal is obtained from the measuring windings, and that it is not until a load is applied that an output signal is obtained therefrom. Hence the signal, which may be in the form of a voltage, constitutes a measure of the force acting parallel to the upper plate, i.e. the force acting on the roller in a direction parallel with the plate. This force is a measure of the tension appearing in the article passing over the roller.

Owing to the arrangement of the resilient rods 7 the force acting perpendicular to the plates 4, 5 is absorbed by said rods and hence the transmitter rods are only acted upon by said parallel force component.

Another embodiment of the measuring arrangement is shown in FIGS. 3 and 4; FIG. 4 showing a section taken through the line IV—IV in FIG. 3. Similarly to the embodiment described according to FIGS. 1 and 2 the arrangement comprises a bottom plate consisting of sections 1 and 2 provided with holes 3, and an upper plate consisting of sections 4, 5 presenting holes 6 and being parallel to said bottom plate. Analogous with the previously described embodiment four resilient rods 7 are arranged in the corners of a rectangle, between the plates. Positioned inside said rods are members 8 and 9, wherein one end of one member is securely arranged on the bottom plate 1, 2 and one end of the other member is securely arranged on the upper plate 4, 5. The respective opposite ends of members 9 and 8 are freely arranged in recessed 11 disposed in the upper and lower plate, respectively. As with the embodiment of FIGS. 1 and 2, the members are adapted to function as a safe-guard against overloading, so that the plate 4, 5 is not depressed to greatly. Bolt-like members 12 are disposed in members 8 and 9. Clamped between the bolt members 12 by means of thrust washer 24 is a magnetoelastic measuring rod 21, provided with magnetizing and measuring windings. The measuring rod 21 is enclosed by a body 22, which also includes compensating means. The body 22 is attached to the plate 2 by securing means 23.

A fixed connection between the upper plate 4, 5 and the bottom plate 1, 2, is obtained by screwing the bolt-like members 12 against the rod 21, via the thrust washers 24. When the upper plate is acted upon by a force, in a direction from the member 9 towards the member 8, said upper plate will be displaced somewhat relative to the bottom plate. This means that the member 9 with associated bolt-like member 12 will move towards member 8. Thus, the measuring rod 21 will be acted upon by a compression force, so that the permeability of the rod is changed. This, in turn, results in a change in the flow through the windings on the rod, so that a signal is obtained from the measuring winding. The signal, in the form of a voltage for instance, thus constitutes a measure of the load which acts parallel to the upper plate; i.e. a measure of the tension appearing in the strip, wire-rope, wire or the like, passing over the roller.

The embodiment described according to FIGS. 3–4 is to be preferred when determining large components of force.

The space between the plates 1 and 4 is protected by a cover, to prevent dust and water entering the transmitter elements. Consequently, the plate sections 2 and 5 are shorter and narrower than the plate sections 1 and 4. The cover is made in two parts and an elastic material which permits a certain degree of displacement between the said parts is inserted in the joint therebetween.

The geometric design of the measuring device is not restricted to the described embodiments but can be varied arbitrarily within the scope of the following claims.

What is claimed is:

1. An apparatus for measuring tensile force in articles having a continuous length and supported between two points comprising:

a base;

a plate parallel to the base;

roller means on the plate for contacting and deflecting said article;

structural means connecting said base to said plate including spring means capable of absorbing forces generated perpendicular to the plate;

and permitting said plate to move relative to said base in a plane parallel to said base in response to the component of tension in said article parallel to said base, said movement causing bending of said structural means and means operatively connected to said structural means for measuring bending as an indication of the tension in said articles.

2. An apparatus for measuring tensile forces as in claim 1, wherein the means for measuring the bending include at least one measuring rod of magneto-elastic material, and the spring means are leaf springs.

3. An apparatus for measuring tensile forces as in claim 2, wherein said structural means include two rigid members each member having one end attached to the plate and the base has two recess portions for accommodating the other ends of the rigid members.

4. An apparatus for measuring tensile forces as in claim 3, where each of the rigid members includes a bolt member arranged parallel to the plate contacting the measuring rods and serving to transmit forces from said rigid members to said rods.

5. An apparatus for measuring tensile forces as in claim 2, where one rigid member is attached to the base.

6. An apparatus for measuring tensile forces as in claim 2 wherein said spring means include leaf springs positioned at each corner of the plate.

References Cited

UNITED STATES PATENTS 3,186,220   6/1965   Flinth _____ 73—141

FOREIGN PATENTS 192,553   11/1964   Sweden.
145,517   3/1961   U.S.S.R.
718,194   9/1965   Canada.

RICHARD C. QUEISSER, Primary Examiner

J. J. WHALEN, Assistant Examiner

U.S. Cl. X.R.

73—88.5